US005737575A

United States Patent [19]
Blaner

[11] Patent Number: 5,737,575
[45] Date of Patent: Apr. 7, 1998

[54] INTERLEAVED KEY MEMORY WITH MULTI-PAGE KEY CACHE

[75] Inventor: Bartholomew Blaner, Newark Valley, N.Y.

[73] Assignee: International Business Machines Corporation, Armonk, N.Y.

[21] Appl. No.: 406,751

[22] Filed: Feb. 28, 1995

Related U.S. Application Data

[63] Continuation of Ser. No. 883,516, May 15, 1992, abandoned.

[51] Int. Cl.$^6$ ............................................. G06F 13/00
[52] U.S. Cl. ........................ 395/491; 395/472; 395/479; 395/483
[58] Field of Search ............................ 395/483, 491, 395/472, 479

[56] References Cited

U.S. PATENT DOCUMENTS

| | | | |
|---|---|---|---|
| 3,670,307 | 6/1972 | Arnold et al. | 395/458 |
| 3,761,883 | 9/1973 | Alvarez et al. | 340/172.5 |
| 4,293,910 | 10/1981 | Flusche et al. | 395/484 |
| 4,317,168 | 2/1982 | Messina et al. | 364/200 |
| 4,355,355 | 10/1982 | Butwell et al. | 395/400 |
| 4,481,573 | 11/1984 | Fukunaga et al. | 364/200 |
| 4,589,064 | 5/1986 | Chiba et al. | 395/491 |
| 4,658,356 | 4/1987 | Shiozaki et al. | 395/425 |
| 4,954,982 | 9/1990 | Tateishi et al. | 364/900 |
| 5,016,168 | 5/1991 | Liu | 395/375 |
| 5,018,063 | 5/1991 | Liu | 395/650 |
| 5,023,776 | 6/1991 | Gregor | 364/200 |
| 5,276,848 | 1/1994 | Gallagher et al. | 395/425 |
| 5,307,495 | 4/1994 | Seino et al. | 395/325 |

*Primary Examiner*—David L. Robertson
*Attorney, Agent, or Firm*—Whitham, Curtis, Whitham & McGinn; Arthur J. Samodovitz

[57] ABSTRACT

Memory access latency is reduced by storage of additional pages of a block together with storage protection keys in a cache memory. When a miss occurs for a particular address and/or a corresponding storage protection key in an address translation look-aside buffer, other storage protection keys for other pages of the same block containing the page causing the miss are associatively accessed from a multi-page key cache. Thus, pages which do not have addresses or storage protection keys stored in the translation look-aside buffer but which are locally stored in a cache may have the storage protection keys provided locally with short access time and without communication over a network.

4 Claims, 3 Drawing Sheets

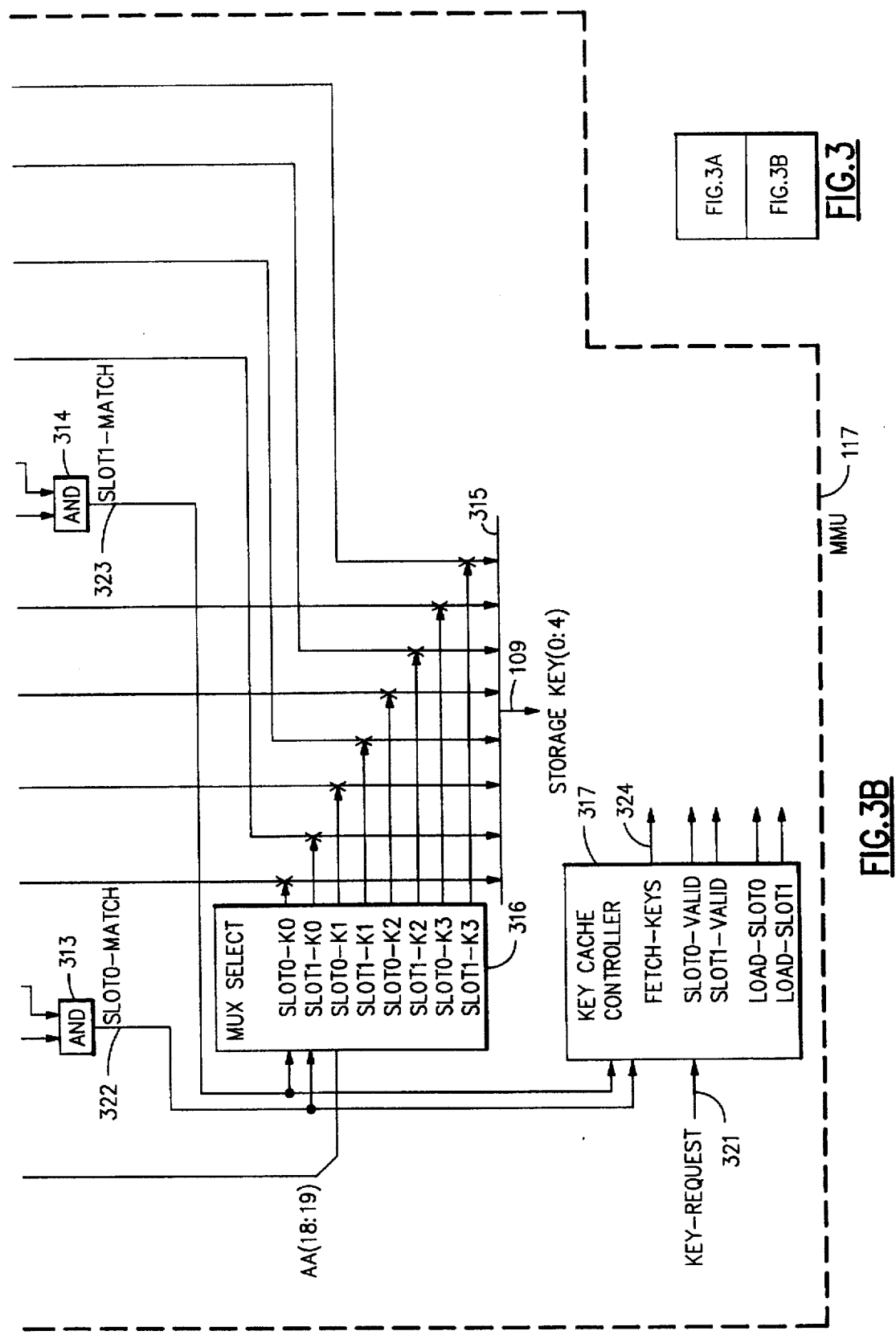

INTERLEAVED KEY MEMORY WITH MULTI-PAGE KEY CACHE

This application is a continuation of application Ser. No. 07/883,516, filed May 15, 1992, abandoned.

FIELD OF THE INVENTION

This invention relates to high-speed computers and computer systems and particularly to computer systems which employ key-controlled storage protection.

REFERENCES USED IN THE DISCUSSION OF THE INVENTION

During the detailed description which follows the following works will be referenced as an aid for the reader. These additional references are:

Eberhard, R. J., "Early Release of a Processor Following Address Translation Prior to Page Access Checking," IBM Technical Disclosure Bulletin, March, 1991.

Messina, B. U, and Silkman, W. D., "Cache Organization Enabling Concurrent Line Castout and Line Fetch Transfers with Main Storage," U.S. Pat. No. 4,317,168, February, 1982.

Alvarez, et al., U.S. Pat. No. 3,761,883, September, 1973.

"ESA/370 Principles of Operation," IBM Corporation, August 1988.

These additional references are incorporated by reference.

BACKGROUND OF THE INVENTION

This invention concerns the operation of digital computers, and is particularly directed to the processing of storage keys in a computer that employs key-controlled storage protection. For example, the ESA/370 architecture, as described in the manual "ESA/370 Principles of Operation," published by IBM Corporation, in August 1988, associates a storage key with each 4K-byte page of central storage that is available in a processor configuration. In this architecture, an access key is held in the program status word in the instruction processing unit and if a reference to a given page of storage is subject to key-controlled protection, certain bits of the storage key for the referenced page are matched with the access key. The reference is either allowed or prohibited depending on the outcome of the match and whether the reference is a fetch or a store.

In ESA/370, one storage key is allocated to every 4K-byte central storage page. Physically, keys are usually kept in random access memory (RAM) arrays associated with central storage. This location makes the storage keys visible to all processors and input/output channels in the configuration, but also causes the latency associated with fetching a key for matching with the access key for a given storage reference to be prohibitively high. To reduce this latency, processor designs often take advantage of the fact that a key is associated with a 4K-byte page of central storage, which in ESA/370 is the fundamental unit of virtual storage. Virtual storage addresses of 4K-byte pages are translated to absolute storage addresses by the process of dynamic address translation (DAT). That is, the result of DAT is the absolute address (AA) of a 4K-byte page. When a Virtual address (VA) is translated to an absolute address, a copy of the storage key is fetched and stored in the address translation look-aside buffer (TLB) along with the valid VA-to-AA translation. The TLB is an associative memory that maintains the most recent VA-to-AA translations. Each time the TLB is accessed for subsequent storage references, if the reference is subject to key-controlled protection, the TLB copy of the storage key is matched with the access key as described. Thus, the storage key fetch latency is incurred only once over the lifetime of a valid VA-to-AA translation in the TLB.

There are two problems with this method of storage key handling. First, the TLB is an associative memory of finite size. Thus, the lifetime of a given valid VA-to-AA translation in the TLB is finite. If a translation has been deleted from the TLB (invalidated) and the page is referenced at some future point a TLB miss will occur. Consequently, the storage key must be refetched and the fetch latency will be incurred again. Second, central storage access latency continues to increase relative to instruction processing latency. The fact that cache memory, and indeed multiple levels of cache memory, are employed almost universally in processor designs testifies to this fact. Multiprocessor systems further increase the latency by interposing arbitration circuitry, routing functions, and the like, between shared resources, such as central storage and the storage keys, and the processors. Consequently, the latency of even one storage key fetch is becoming more and more prohibitive.

The article by Eberhard, R. J., entitled "Early Release of a Processor Following Address Translation Prior to Page Access Checking," in the IBM Technical Disclosure Bulletin, dated March, 1991, describes a mechanism for hiding the key fetch latency in a processor that keeps a copy of the storage key for a given central storage page in its corresponding TLB entry. The mechanism allows a processor to continue executing instructions while a storage key is being fetched. The logic circuits required to implement this mechanism to allow just one outstanding key fetch are numerous and complex, particularly with respect to store-type references. Further, since the mechanism uses only the TLB as a repository for most recently used keys, it does nothing to solve the first problem described above.

U.S. Pat. Nos. 4,293,910 and 3,761,883 keep the key for a line of cached central storage data in its corresponding cache directory entry. While keeping cached keys in close proximity to the processor, both inventions exhibit the first problem described above, since a cache directory and a TLB are analogous associative memory structures. Neither invention reduces key fetch latency; thus both exhibit the second problem described above. Further, since cache lines are typically much smaller than a central storage page (typically from 16 to 64 cache lines per central storage page), the storage key for a single page will likely be stored in multiple cache directory entries, resulting in key storage inefficiencies.

SUMMARY OF THE INVENTION

The improvements made herein effect an improvement in the art by reducing the effective storage key fetch latency. Hardware apparatus is provided that takes advantage of the locality of central storage reference patterns at the 4K-byte page level. That is, if a first page at a given absolute address is referenced and its storage key obtained, pages in the vicinity, i.e., at nearby absolute page addresses, of the first page are likely to be referenced with high probability. If the storage keys for these nearby pages can be obtained simultaneously with that of the first page and retained for later use, then latencies for fetching the storage keys for the nearby pages can be eliminated. The apparatus consists of an interleaved key memory, which employs the well-known technique of memory interleaving to allow storage keys for multiple pages to be fetched simultaneously, and cache storage means for retaining the storage keys for multiple pages and providing them for comparison to the access key upon request. This improvement is set forth in the following detailed description. For a better understanding of the invention with advantages and features, reference may be had to the description and to the drawings.

BRIEF DESCRIPTION OF THE DRAWINGS

Referring to the drawings.

DETAILED DESCRIPTION OF THE INVENTION

Figure 1:
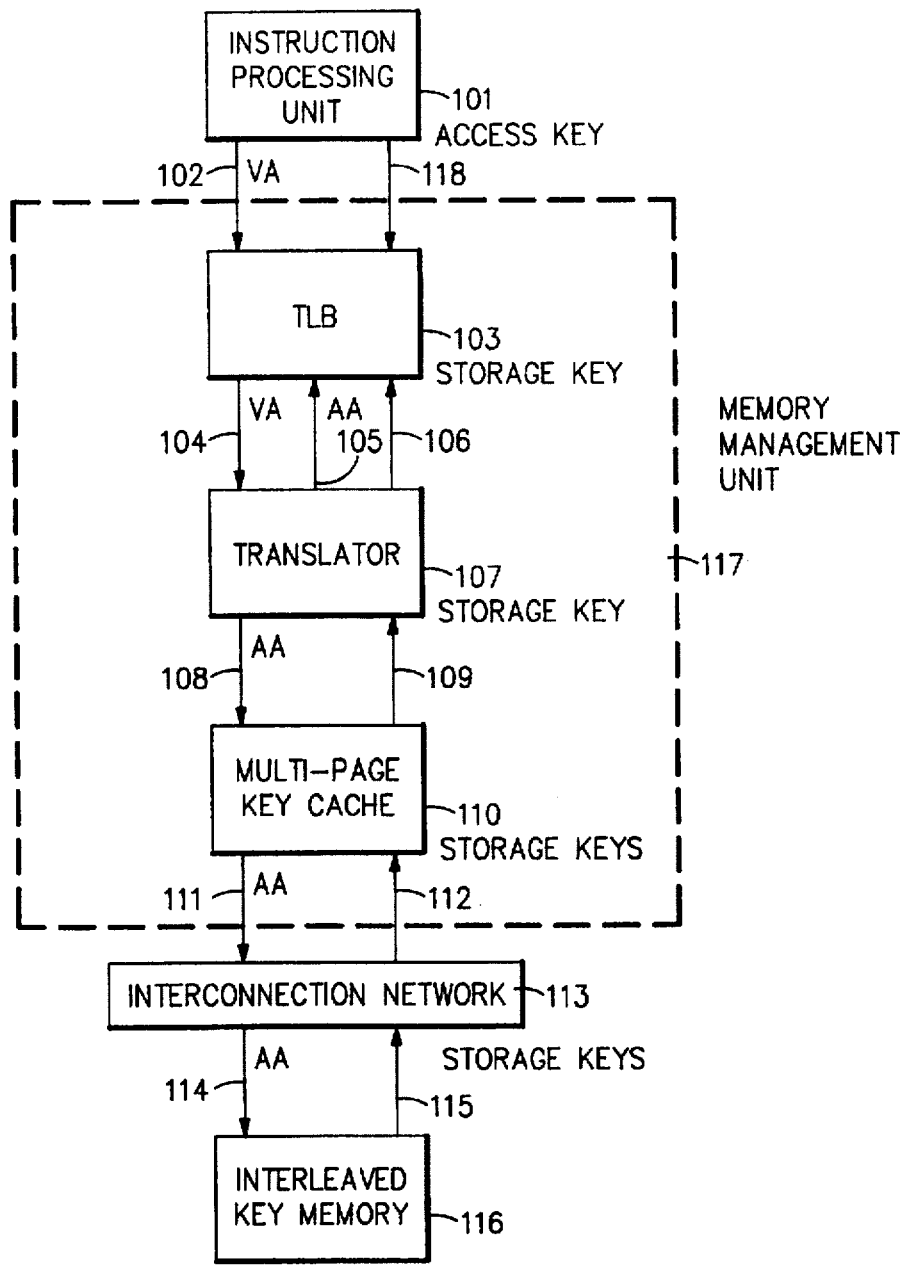
FIG. 1 shows a representative embodiment of a portion of a digital computer system constructed in accordance with the present invention.

Referring to FIG. 1 of the drawings, there is shown a representative embodiment of a portion of a digital computer system in accordance with the present invention. It includes instruction processing unit (IPU) 101 coupled by virtual address (VA) lines 102 and access key lines 118 to TLB 103 in memory management unit (MMU) 117. MMU 117 further consists of translator 107 and multi-page key cache 110, as well as the directory for a first-level (L1) cache, which is not shown in the figure. MMU 117 is coupled to interconnection network 113 via lines 111 and 112. Other signal lines, such as those for control and data information, are not shown. Interconnection network 113 allows a plurality of IPU/MMU combinations like IPU 101 and MMU 117 to be connected to a shared central resource, such as interleaved key memory 116, which is connected to interconnection network 113 by lines 114 and 115.

The operation of the invention will now be described in the context of a storage reference to a given VA. TLB 103 provides temporary storage for the most recent virtual page address to absolute page address translations and the storage key for the corresponding page, in accordance with TLB methods well known in the art. If TLB 103 contains a valid virtual-to-absolute address mapping for the VA presented on lines 102, a TLB hit is said to have occurred. If no such mapping exists, a TLB miss is said to have occurred and the VA is transmitted to address translator 107 on lines 104, where dynamic address translation (DAT) is performed. The operation of the translator is in accordance with that known in the art and will not be reiterated here. The end result of DAT is an absolute address (AA), which is presented to multi-page key cache 110 on lines 108 for an associative access of the multi-page key cache storage means. If a matching AA is found in a valid entry in multi-page key cache 110, the storage key for the corresponding page is provided to translator 107 on lines 109, which, in turn, supplies the storage key to TLB 103 on lines 106, together with the corresponding AA on lines 105. TLB 103 is then free to form a valid entry with the original VA, the AA produced by translator 107, and the storage key supplied by the multi-page key cache 110. A high-latency storage key fetch across interconnection network 113 to interleaved key memory 116 is thus avoided. If, on the other hand, no matching AA is found in multi-page key cache 110, the AA is transmitted on AA lines 111 to interconnection network 113, which, in turn, transmits the AA on lines 114 to interleaved key memory 116. Interleaved key memory 116 is then accessed, providing storage keys for the block of pages at the AA on lines 114 including the page specified on AA lines 108 to interconnection network 113 on lines 115. Interconnection network 113 then transmits the storage keys to multi-page key cache 110 on lines 112, where the storage keys are associatively stored, in accordance with cache storage methods well known in the art. After the storage keys have been stored in an entry in multi-page key cache 110, the multi-page key cache is re-accessed with the AA originally presented on lines 108. A matching entry is found on this re-access, and the resulting storage key is transmitted to translator 107 on lines 109, which then completes the DAT process by supplying to TLB 103 the AA on lines 105 and the corresponding storage key on lines 106. TLB 103 is then free to form a valid entry with the original VA, the AA produced by translator 107, and the storage key supplied by the combined operation of multi-page key cache 110, interconnection network 113 and interleaved key memory 116. A subsequent storage reference that causes a miss in TLB 103 but refers to an AA that matches the AA for the block of pages in the newly created multi-page key cache entry will find its corresponding storage key in the entry, and thus avoid a high latency key fetch across interconnection network 113 to interleaved key memory 116.

THE PREFERRED EMBODIMENT

The invention will now be described in greater detail. While the description will be in terms of the ESA/370 architecture, as set forth in manual "ESA/370 Principles of Operation," it is understood that application of the invention to other similar computer architectures may be readily made by those skilled in the art.

Figure 2:
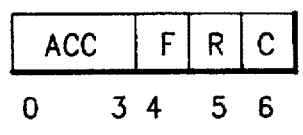
FIG. 2 shows a storage key in accordance with the ESA/370 architecture definition.

The format of the storage key will first be described. FIG. 2 shows the format of the storage key in accordance with the ESA/370 architecture. The storage key is a 7-bit entity, comprised of the following fields:

ACC Access-control bits. If a storage reference is subject to key-controlled protection, the ACC bits are matched with the four-bit access key when the reference is a store, or when the reference is a fetch and the F bit is one.

F Fetch-protection bit. If a storage reference is subject to key-controlled protection, the fetch-protection bit controls whether key-controlled protection applies to both fetch and store (F=1) or only store (F=0) references.

R Reference bit. Set to one each time information is either stored to or fetched from a location in the page.

C Change bit. Set to one each time information is stored to a location in the page.

Since only the ACC and F bits are relevant to key-controlled protection, only the ACC and F bits of the storage key need to be stored in the multi-page key cache. The R and C bits are not relevant to storage protection, are processed comparatively infrequently relative to storage keys, and thus will not be included in the remaining description.

As previously described, there are two key features of the invention:

1. Interleaved key memory, allowing multiple keys to be fetched in one key memory access, and
2. An associative multi-page key cache, allowing multiple keys to be buffered for later use.

An n-way interleaved key memory is one such that keys for pages 0, 1, . . . n−1 are stored in physically separate RAMs. Thus in any given RAM, if RAM address A addresses the key for page p, then address A+1 addresses the key for page p+n. This memory organization allows n keys to be fetched from the n RAMs in one access. A group of pages referenced in key memory by the same address is called a block. The referencing address is the block address (BA).

Once the keys are fetched for a block of pages, they, together with their corresponding BA, may be stored in the multi-page key cache. The cache is so named because each entry in the cache can store keys for multiple, or a block of, pages. Then, assuming that each entry in the TLB keeps a copy of the key for the associated page as described above, when a TLB miss occurs for a VA and the translator translates the VA to an AA, the AA is used to associatively search the multi-page key cache. A matching entry will yield the storage key for the page.

Figure 3A:
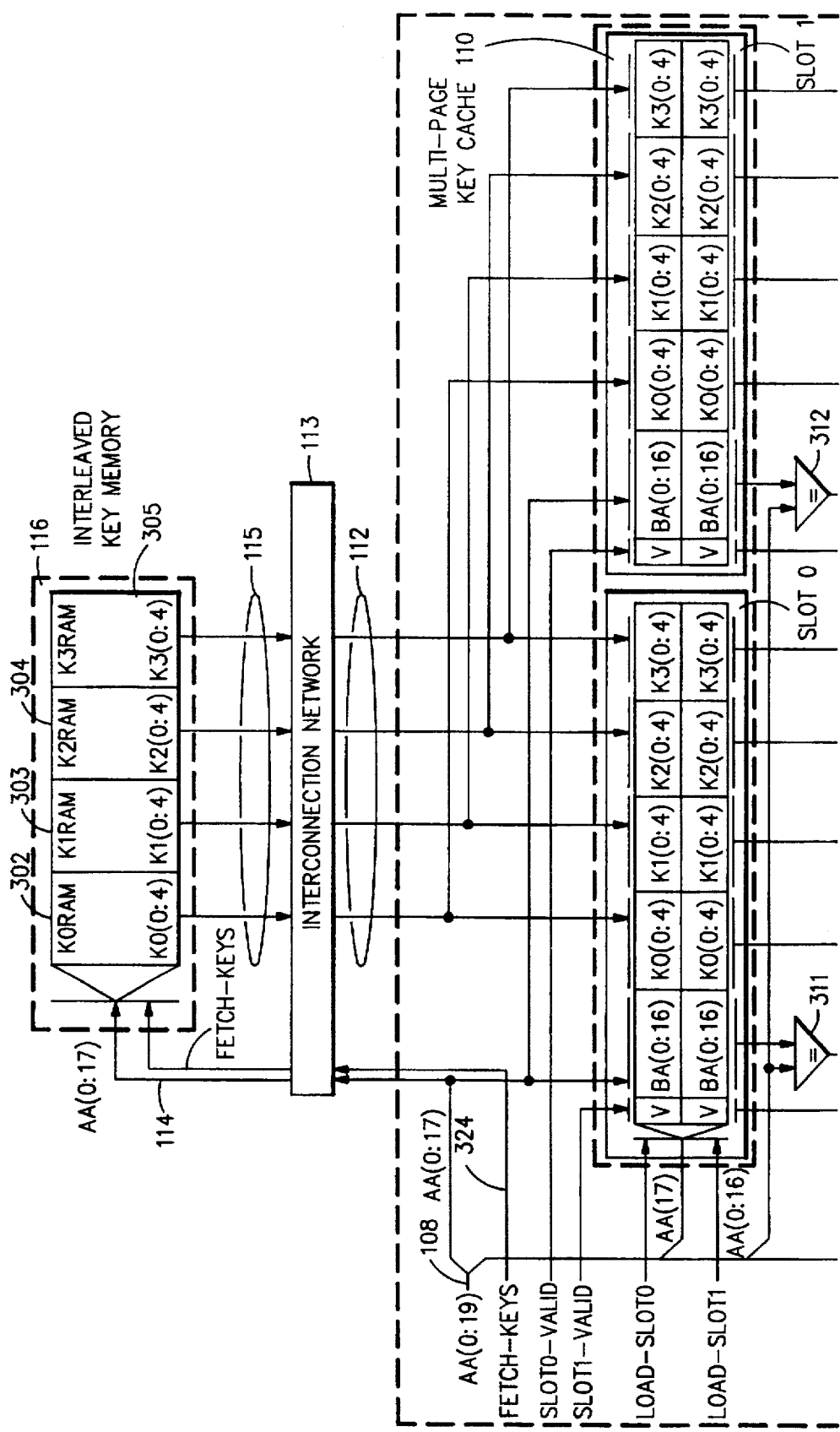
FIG. 3 shows in greater detail the internal construction of a representative embodiment of an interleaved key memory and multi-page key cache which can be used in the computer system of FIG. 1.

An example embodiment with a 4-way interleaved key memory and 2-set, 2-way-associative multi-page key cache is shown in FIG. 3. It will be understood that this organization is exemplary. One skilled in the art may adapt the invention to any feasible key memory interleave or multi-page key cache size. The system is further assumed to have 32G-bytes of absolute central storage organized in 4K-byte pages. Thus, a 32-bit absolute address—AA(0:31)—is required to address a byte location in central storage, while AA(0:19) addresses a page in central storage. Further, AA(0:17) addresses a block of 4 contiguous pages, with page 0 starting at address AA(18:19)=B'00', page 1 at address AA(18:19)=B'01', page 2 at address AA(18:19)=B'10' and page 3 at address AA(18:19)=B'11'. The keys are stored in interleaved key memory 116, in 4 banks of key RAMs—K0RAM 302, K1RAM 303, K2RAM 304 and K3RAM 305—addressed in parallel by block address AA(0:17) on lines 114. When accessed, these RAMs produce storage keys K0(0:4), K1(0:4), K2(0:4) and K3(0:4), respectively, on lines 115. Storage key lines 115 are connected to MMU 117 via interconnection network 113, which provides the arbitration and routing functions necessary for multiple processors sharing interleaved key memory 116.

Storage key lines 112 are output from interconnection network 113 and connected to MMU 117, specifically to the slot 0 and slot 1 key input ports of multi-page key cache 110. Multi-page key cache 110 is organized into 2 sets, with 2 entries (in the horizontal dimension) per set. The entries are vertically grouped into slots named slot 0 and slot 1. Each entry is further comprised of the following fields:

BA(0:16) Block address bits 0:16 for comparison with AA(0:16).

V Valid entry. If V=1, then BA(0:16) is a valid address and a valid comparison with AA(0:16) may be made. If V=0, the BA is invalid and any comparison is invalid.

K0(0:4) Storage key for page 0 of the block addressed by BA(0:16) concatenated with AA(17).

K1(0:4) Storage key for page 1 of the block addressed by BA(0:16) concatenated with AA(17).

K2(0:4) Storage key for page 2 of the block addressed by BA(0:16) concatenated with AA(17).

K3(0:4) Storage key for page 3 of the block addressed by BA(0:16) concatenated with AA(17).

Multi-page key cache 110 is associatively accessed in response to a request from the translator 107 in FIG. 1. Referring back to FIG. 3, when a multi-page key cache access is required, the translator asserts the KEY-REQUEST signal on line 321 to key cache controller 317 and presents the page address AA(0:19) on lines 108. AA(17) selects one of the two sets in multi-page key cache 110. The slot 0 and 1 entries of the selected set are read out in parallel. BA(0:16) of slot 0 is compared with AA(0:16) by comparator 311. If the addresses match, the output of comparator 311 is asserted, enabling AND gate 313. If the V bit of the entry is equal to 1, the AND gate will assert SLOT0-MATCH on line 322. In parallel with the slot 0 activity, BA(0:16) of slot 1 is compared with AA(0:16) by comparator 312. If the addresses match, the output of comparator 312 is asserted, enabling AND gate 314. If the V bit of the entry is equal to 1, the AND gate will assert SLOT1-MATCH on line 323. It is inherent in the design of the cache that SLOT0-MATCH and SLOT1-MATCH cannot both be equal to one at the same time.

The assertion of either SLOT0-MATCH or SLOT1-MATCH in combination with AA(18:19) will cause MUX Select 316 to gate the desired storage key through multiplexer 315 to the STORAGE KEY(0:4) lines 109. Table 1 shows how gating signals SLOT0-K0, SLOT1-K0, SLOT0-K1, SLOT1-K1, SLOT0-K2, SLOT1-K2, SLOT0-K3 and SLOT1-K4 respond to the various combinations of SLOT0-MATCH, SLOT1-MATCH, and AA(18:19). An "X" in the table denotes a "don't care" value of the corresponding signal.

TABLE 1

| SLOT0-MATCH | SLOT1-MATCH | AA (18:19) | SLOT0-K0 | SLOT1-K0 | SLOT0-K1 | SLOT1-K1 | SLOT0-K2 | SLOT1-K2 | SLOT0-K3 | SLOT1-K3 |
|---|---|---|---|---|---|---|---|---|---|---|
| 0 | 0 | X | X | X | X | X | X | X | X | X |
| 1 | 0 | 00 | 1 | 0 | 0 | 0 | 0 | 0 | 0 | 0 |
| 1 | 0 | 01 | 0 | 0 | 1 | 0 | 0 | 0 | 0 | 0 |
| 1 | 0 | 10 | 0 | 0 | 0 | 0 | 1 | 0 | 0 | 0 |
| 1 | 0 | 11 | 0 | 0 | 0 | 0 | 0 | 0 | 1 | 0 |
| 0 | 1 | 00 | 0 | 1 | 0 | 0 | 0 | 0 | 0 | 0 |
| 0 | 1 | 01 | 0 | 0 | 0 | 1 | 0 | 0 | 0 | 0 |
| 0 | 1 | 10 | 0 | 0 | 0 | 0 | 0 | 1 | 0 | 0 |
| 0 | 1 | 11 | 0 | 0 | 0 | 0 | 0 | 0 | 0 | 1 |
| 1 | 1 | X | | | | invalid | | | | |

SLOT0-K0=1 gates slot 0 K0(0:4) to STORAGE KEY(0:4) lines 109; SLOT1-K0=1 gates slot 1 K0(0:4) to STORAGE KEY(0:4) lines 109; SLOT0-K1=1 gates slot 0 K1(0:4) to STORAGE KEY(0:4) lines 109; SLOT1-K1=1 gates slot 1 K1(0:4) to STORAGE KEY(0:4) lines 109; SLOT0-K2=1 gates slot 0 K2(0:4) to STORAGE KEY(0:4) lines 109; SLOT1-K2=1 gates slot 1 K2(0:4) to STORAGE KEY(0:4) lines 109; SLOT0-K3=1 gates Slot 0 K3(0:4) to STORAGE KEY(0:4) lines 109; and SLOT1-K3=1 gates slot 1 K3(0:4) to STORAGE KEY(0:4) lines 109.

If SLOT0-MATCH=0 and SLOT1-MATCH=0, as shown in the first row of Table 1, a multi-page key cache miss has occurred and the contents STORAGE KEY(0:4) lines 109 are invalid. Key cache controller 317 will then assert the FETCH-KEYS signal on line 324 across interconnection network 113 to interleaved key memory 116, together with AA(0:17) on lines 114. Four storage keys will be read from interleaved key memory 105 at address AA(0:17) as described above. The keys are forwarded to interconnection network 113 on lines 115, then to multi-page key cache 110 on lines 112. Key cache controller 317 will then select an entry from 1 of the 2 slots in the set addressed by AA(17) and load that entry with BA(0:16)=AA(0:16) and the 4 storage keys on lines 112, and set V=1 in that entry. Key cache controller 317 output signals LOAD-SLOT0 and SLOT0-VALID cause the entry in slot 0 to be loaded and V bit to be set equal to 1. Output signals LOAD-SLOT1 and SLOT1-VALID cause the entry in slot 1 to be loaded and the V bit set equal to 1. When the entry is load and validated, multi-page key cache 110 is reaccessed in a manner identical to the initial access to provide the storage key to the translator on lines 109 for the page addressed by AA(0:19).

Selection of which entry to load in either of the two slots in the set addressed by AA(17) is a two-step process:

1. If either entry has V=0, load the entry that has V=0.
2. If neither entry has V=0, load the entry implicated by the entry replacement circuitry.

The entry replacement circuitry, which is not shown, may use any associative storage entry replacement algorithm commonly employed in the art, such as least-recently-used replacement (LRU), or random replacement, to choose between the two entries.

Initially, all V bits in multi-page key cache 110 are set to 0. This fact, together with the replacement algorithm, assure that SLOT0-MATCH and SLOT1-MATCH will never be equal to one at the same time.

While the preferred embodiment of the invention has been described, it will be understood that those skilled in the art, both now and in the future, may make various improvements and enhancements which fall within the scope of the claims which follow. These claims should be construed to maintain the proper protection for the inventions first disclosed.

What is claimed is:

1. In a digital computer system, the combination comprising:

a plurality of storage protection keys, a first storage mechanism for storing storage protection keys, said first storage mechanism allowing multiple said storage protection keys to be accessed in parallel in response to a single access to said first storage mechanism, and a memory management unit including a translation lookaside buffer having storage means for storage of storage protection keys, said memory management unit further including a second storage mechanism, said memory management unit having means for requesting storage protection keys and for receiving said multiple storage protection keys, said second storage mechanism being coupled between said first storage mechanism and said translation lookaside buffer, for receiving said multiple storage protection keys from said first storage mechanism, for storing said multiple storage protection keys received in response to accesses of said first storage means, and for associatively retrieving one of said multiple storage protection keys stored in said second storage mechanism when a particular storage protection key is not available from said translation lookaside buffer.

2. The combination of claim 1 wherein said first storage mechanism is comprised of interleaved random access memory banks, and wherein a group of said interleaved random access memory banks are accessible in parallel in response to a single access.

3. The combination of claim 2 wherein said second storage mechanism is a cache.

4. The combination of claim 3 wherein said translation lookaside buffer of said memory management unit further includes an address translator, said translation lookaside buffer storing a copy of said storage protection key for a central storage page in a translation lookaside buffer entry, said address translator including means for supplying said translation lookaside buffer with a central storage address and a storage protection key when a translation lookaside buffer miss occurs, said address translator receiving said storage protection key from said second storage mechanism when said second storage mechanism has previously stored said storage protection key, said second storage mechanism receiving a storage protection key as one of said multiple storage protection keys received from said first storage mechanism when said storage mechanism has not previously stored said second storage protection key.

* * * * *